June 5, 1956     H. J. CRULL     2,748,747
METHOD AND APPARATUS FOR PRODUCING FISH BAIT
Filed Feb. 23, 1952

INVENTOR.
HENRY J. CRULL
BY
ATTORNEY

United States Patent Office 2,748,747
Patented June 5, 1956

2,748,747
METHOD AND APPARATUS FOR PRODUCING FISH BAIT

Henry J. Crull, Andrews, Ind.

Application February 23, 1952, Serial No. 273,117

9 Claims. (Cl. 119—1)

This invention relates to methods and apparatus for producing and marketing live bait and more particularly relates to methods and apparatus for producing and marketing live bee worms or similar worms. This application is a continuation in part of my co-pending application, Serial No. 211,723, filed February 19, 1951.

Conventional methods and apparatus for producing and marketing live bait are rather crude and expensive in that no well-defined and scientific methods exist for breeding and raising the various types of worms which are customarily used by fishermen for bait purposes. Usual methods consist of breeding and raising worms in any type of container which may be handy, extracting the worms therefrom one by one and placing them manually in a can or other container for sale to the fishermen. This involves an inordinate amount of labor and the package, as sold, is bulky, unhandy and in no way adapted to preserve the life of the bait. Furthermore, the extraction of the worms from the package is tedious and apt to result in appreciable multilation of the worms and soiling of the hands and clothing.

Accordingly, it is the principal object of this invention to provide a novel method and apparatus for producing and marketing a novel fish bait.

Another object of this invention is to provide a novel method and apparatus for breeding and feeding fish bait.

Still another object of this invention is to provide a novel method and apparatus for packaging fish bait.

A further object of this invention is to provide a novel package of fish bait adapted to be marketed directly to a fisherman and so constructed that the bait can be extracted therefrom without mutilation of the bait and without incurring undue soiling of the hands and clothing.

In accordance with this invention there is provided a bait breeding, feed and packaging apparatus consisting of a room having a source of light therein and a plurality of feeding and breeding boxes having closures adapted to maintain darkness within the interior of the boxes thereby to confine the bait within the boxes, said boxes including supporting devices for supporting a bait package into which worms, such for example, as bee worms, may crawl and seal themselves.

Still another feature of this invention is a novel package of fish bait comprising a container having a series of transverse slots therein and worms in each slot which are sealed therein by their own webbing.

For a better understanding of the invention, together with other and further objects thereof, reference is made to the following description, taken in connection with the accompanying drawings, and its scope will be pointed out in the appended claims.

Figure 1:
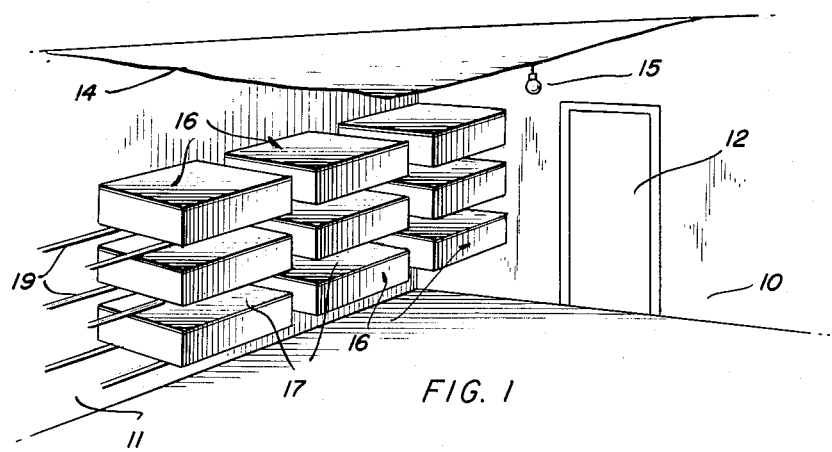
Fig. 1 is a perspective view illustrating a room having feeding and breeding boxes mounted therein.
Figure 2:
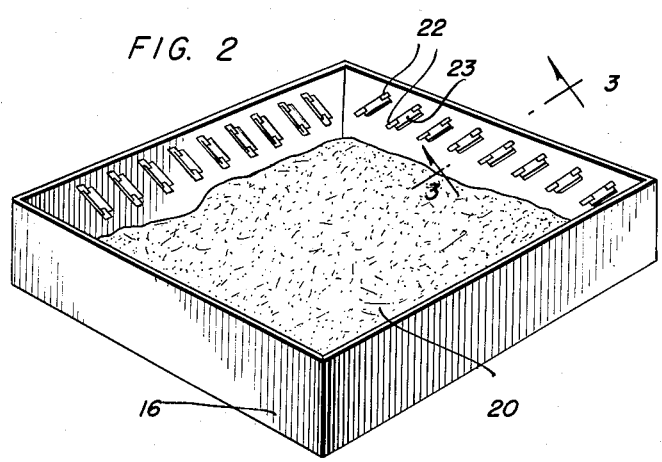
Fig. 2 is a perspective view showing the interior of a feeding and breeding box such as illustrated in Fig. 1.
Figure 3:
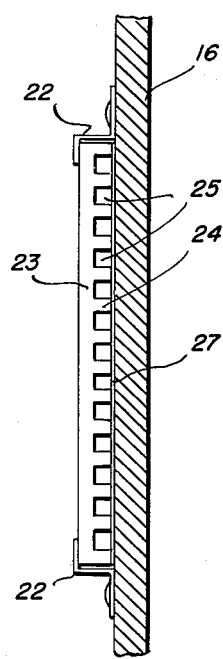
Fig. 3 is a cross-sectional view taken on line 3—3 of Fig. 2 and illustrating the bait container as mounted within the feeding and breeding box.
Figure 4:
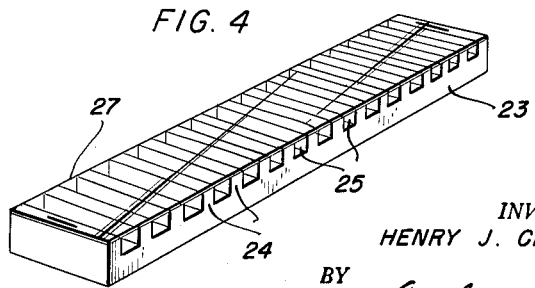
Fig. 4 is a perspective view illustrating a bait package as provided in accordance with this invention.

Referring to the drawings: Fig. 1 illustrates a room having four walls such as 10 and 11, a normally closed door 12 and a ceiling 14. From the ceiling 14 may be suspended a light source 15. For feeding and breeding bait such, for example, as bee worms which are customarily found as parasites in bee hives, there are provided a plurality of containers 16 which may be rectangular wooden boxes provided with covers 17. The boxes may be supported on a plurality of longitudinal members 19. Within each of the boxes 16 there may be provided a quantity of feeding material 20 which may consist of a mixture of honey, wheat flour, soy bean meal or the like. A number of bee moths may be confined within the container 16 wherein they deposit eggs which develop into worms which in turn bore into and consume the feed 20 until they reach such a degree of size and development that they seek a place within which to seal themselves within a cocoon. At this point, the worms begin to crawl out of the feed and therefore the covers are provided on the boxes so that the interior of the boxes will be dark. When the worm attempts to escape from the box it will be confronted with the light from the source 15. Since bee worms naturally and inherently seek darkness, they are compelled to stay within the boxes 16. Thus the combination of a room having a light source therein with the boxes or containers 16 having covers 17 comprises an apparatus which inherently causes a bee worm to be bred and developed within a certain predetermined space, that is, within each of the boxes 16. This is an important feature of the invention as efficient procedure requires that the bee worms be confined to a predetermined space, such as the interior of boxes 16. Otherwise, the worms would escape from the boxes and build cocoons in every crevice of the room 10, and thus would not be suitable to be marketed as fish bait.

To convert the bee worms into a marketable product, the interior of each of the boxes 16 is provided with a plurality of brackets 22 which are adapted to support a plurality of packages 23. It is to be noted that the brackets 22 are mounted on the vertical interior surfaces of the box at an angle to the vertical. It is further to be noted that each of the packages 23 may comprise a wooden strip having a plurality of spaced ribs 24 which define slots 25 within which a bee worm may form a cocoon. Packages 23 are mounted at an angle to the vertical with the slotted side facing inwardly toward the side of the box. This angular mounting insures that the worms will find a slot even though they may be crawling vertically or horizontally or at any angle between these extremes. Between the slotted side of package 23 and the wall of the box, there is a protective covering 27 which may be a sheet of material such as cellophane, celluloid or other semi-plastic substance. It is essential to provide this sheet 27 for preventing the bee worms from attaching their cocoons to the wall of the box 16 as will be obvious from further description.

As the bee worms complete their growth and reach the stage where they are to form a cocoon, they emerge from feed 20 and crawl over the interior surfaces of the box 16. As explained hereinbefore, the light source 15 and the darkness within the box cause the bee worms to avoid emerging from the box and therefore their entire activity is limited to the inner surfaces of the box. In crawling hither and yon, a worm sooner or later finds one of the slots 25 in package 23, which is the type of crevice within which such worms naturally form their cocoon. Thus, one worm after another crawls within the slots 25 automatically filling the package 23. Each worm proceeds to form its cocoon around itself and in attachment to the ribs 24 and the sheet 27. It is important to note that each of the packages 23 may contain a predetermined number of slots. If it is desired to market the worms by the dozen, each package may be formed to provide a dozen slots. Therefore, the bee worms automatically count themselves as they fill each package. Practical experience shows that it requires approximately twenty-four hours to fill the packages which may be mounted within the box 16 and therefore it is feasible to extract the packages 23 from the boxes once each 24 hours and replace the filled packages with new ones. Thus it is possible every twenty-four hours to extract from each box 16 a plurality of packages 23 within which there is a predetermined number of bee worms which are automatically sealed within the package through the natural cocoon building activities of the bee worms. After extracting each package 23 from the box it is merely necessary to seal the plastic covering 27 over each edge of the package in such a manner as to close the slots 25. Thus there is provided a marketable package including a predetermined number of bee worms.

In order that there may be continual breeding of bee worms, it is important to allow a certain percentage of the worms to remain in the breeding boxes so that they may progress through the natural life cycle and develop into moths which deposit eggs from which the worms hatch. By following this procedure and replenishing the supply of feed, there is a substantially perpetual supply of bee worms.

My invention has been described in connection with the production of bee worms but will be obvious to those skilled in the art that there may be many other types of worms which may be bred and packaged in the same manner as bee worms. The invention has further been described as including the package having slots therein. This is of great advantage in that there is a structure for providing a package having a predetermined number of worms therein but it is to be understood that it is quite possible to obtain similar results if there are no slots in the package 23. Instead, there may be only two end ribs 24 on each package at each end thereof. If the package 23 is made of a predetermined length then only a predetermined maximum number of worms may build cocoons within the space provided. However, there would be some variation between the minimum and maximum number of worms which might be found within the package. The provision of the ribs insures that each worm will build a cocoon transversely of the package thereby insuring an accurate count and making it handy for a fisherman to extract worms from the package.

From the foregoing description of this invention it will be obvious that there is provided a mass production method and apparatus for producing and marketing live fish bait. It is only necessary to cool the packages and contents after they are removed from the boxes in order to keep the bee worms alive over a period of several months. Practical experience shows that if cooled to forty or forty-five degrees Fahrenheit the worms packaged in the manner described above will live from six to eight months.

The apparatus provided in accordance with this invention is such that the worms automatically fill the packages and count themselves. This is due primarily to the provision of the light source and the covers on the boxes and also to the combination of the packages with the feeding and breeding boxes. All of these factors in combination result in the production of a packaged fish bait containing a predetermined number of worms sealed within the package and readily available to the fishermen.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:

1. Apparatus for breeding, feeding and packaging fish bait comprising a container for feeding and breeding worms, a source of light supported externally of said container to repel worms from the exterior space around said container, a loosely fitting cover on said container for admitting air and excluding light therefrom to provide a natural habitat for said worms in the form of a dark space, a plurality of slotted packages supported at an angle to the vertical on the interior vertical walls of said container for providing worm-receiving apertures and a package cover between each package and the adjacent walls for providing a surface to which said worms may attach their cocoons and which is removable from said walls.

2. Apparatus for breeding, feeding and packaging fish bait comprising a container for feeding and breeding worms, a source of light supported externally of said container to repel worms from the exterior space around said container, a loosely fitting cover on said container for admitting air and excluding light therefrom to provide a natural habitat for said worms in the form of a dark space, and package means disposed inside said container and having worm-receiving portions into which worms may crawl and web themselves.

3. Apparatus for breeding, feeding and packaging fish bait comprising a container for feeding and breeding worms, a plurality of slotted packages supported at an angle to the vertical on the interior vertical walls of said container for providing worm-receiving apertures and a package cover between each package and the adjacent wall for providing a surface to which said worms may attach their cocoons and which is removable from said walls.

4. Apparatus for breeding, feeding and packaging fish bait comprising a container for feeding and breeding worms, a plurality of packages supported on the interior vertical walls of said container for providing a natural worm-receiving space, said packages having cavities therein, and means between each package and the adjacent wall for providing a surface to which said worms may attach their cocoons and which is removable from said walls.

5. Apparatus for breeding, feeding and packaging fish bait comprising a container for feeding and breeding worms, a plurality of packages having slots supported on the interior vertical walls of said container for providing worm-receiving apertures and a package cover between each package and the adjacent wall for providing a surface to which said worms may attach their cocoons and which is removable from said walls.

6. The method of producing packaged fish bait comprising the steps of growing bee moths and bee moth worms in a darkened enclosure, placing packages provided with a predetermined number of cavities in the vicinity of said moths and worms such that said worms will crawl into said cavities and web themselves thereto, and covering said packages with a material which retains said worms within the respective cavities, said worms as they fill said cavities thereby count themselves and make it unnecessary to count or touch them in completing the package.

7. The method of producing packaged fish bait comprising the steps of growing bee moths and bee moth worms in a darkened enclosure, placing packages provided with a predetermined number of cavities in the vicinity of said moths and worms such that said worms will crawl into said cavities and web themselves thereto, illuminating the exterior of said enclosure whereby said worms will be discouraged from seeking exit from said enclosure, and covering said packages with a material which retains said worms within the respective cavities, said worms as they fill said cavities thereby count themselves and make it unnecessary to count or touch them in completing the package.

8. The method of producing packaged fish bait comprising the steps of growing bee moths and bee moth worms in a darkened enclosure, placing packages provided with a predetermined number of cavities in the vicinity of grown moths and worms such that said worms will crawl into said cavities and web themselves thereto, maintaining said packages in a darkened space whereby the worms will not seek exit therefrom, and covering said packages with a material which retains said worms within the respective cavities, whereby said worms as they fill said cavities thereby count themselves and make it unnecessary to count or touch them in completing the package.

9. The method of producing packaged fish bait comprising the steps of providing a plurality of bee moths and bee moth worms in a darkened enclosure, placing packages provided with a predetermined number of cavities in the vicinity of said moths and worms such that said worms will crawl into said cavities and web themselves thereto, illuminating the exterior of said enclosure whereby said worms will be discouraged from seeking exit from said enclosure, and covering said packages with a material which retains said worms within the respective cavities, whereby said worms as they fill said cavities thereby count themselves and make it unnecessary to count or touch them in completing the package.

References Cited in the file of this patent

UNITED STATES PATENTS

| Number | Name | Date |
|---|---|---|
| 95,100 | Flick | Sept. 21, 1869 |
| 784,072 | Roberts | Mar. 7, 1905 |
| 1,744,388 | Johnson | Jan. 21, 1930 |
| 1,816,368 | Fioruzzi | July 28, 1931 |
| 1,982,112 | Lang | Nov. 27, 1934 |
| 2,133,021 | Ferguson | Oct. 11, 1938 |
| 2,138,241 | Koch et al. | Nov. 29, 1938 |
| 2,168,651 | McCoy | Aug. 8, 1939 |
| 2,386,416 | Wilhelm | Oct. 9, 1945 |
| 2,436,109 | Kollman | Feb. 17, 1948 |
| 2,495,367 | Edmonstone | Jan. 24, 1950 |
| 2,527,214 | Graves | Oct. 24, 1950 |

FOREIGN PATENTS

| 509,754 | Germany | Oct. 13, 1930 |
|---|---|---|